(12) United States Patent
Juretus et al.

(10) Patent No.: US 12,393,738 B2
(45) Date of Patent: Aug. 19, 2025

(54) ENHANCED CIRCUITY SECURITY THROUGH HIDDEN STATE TRANSITIONS

(71) Applicant: Drexel University, Philadelphia, PA (US)

(72) Inventors: Kyle Joseph Juretus, Quakertown, PA (US); Ioannis Savidis, Wallingford, PA (US)

(73) Assignee: Drexel University, Philadelphia, PA (US)

( * ) Notice: Subject to any disclaimer, the term of this patent is extended or adjusted under 35 U.S.C. 154(b) by 291 days.

(21) Appl. No.: 16/980,471

(22) PCT Filed: Mar. 13, 2019

(86) PCT No.: PCT/US2019/022088
§ 371 (c)(1),
(2) Date: Sep. 14, 2020

(87) PCT Pub. No.: WO2019/178255
PCT Pub. Date: Sep. 19, 2019

(65) Prior Publication Data
US 2021/0019449 A1 Jan. 21, 2021

Related U.S. Application Data

(60) Provisional application No. 62/642,128, filed on Mar. 13, 2018.

(51) Int. Cl.
*G06F 21/75* (2013.01)
*G06F 9/448* (2018.01)
*G06F 21/76* (2013.01)
*G06F 21/79* (2013.01)

(52) U.S. Cl.
CPC ............ *G06F 21/75* (2013.01); *G06F 9/4498* (2018.02); *G06F 21/76* (2013.01); *G06F 21/79* (2013.01)

(58) Field of Classification Search
CPC ........... G06F 21/75; G06F 21/76; G06F 21/79
See application file for complete search history.

(56) References Cited

U.S. PATENT DOCUMENTS

| 4,028,647 A | 6/1977 | Yee |
| 4,127,825 A | 11/1978 | Blomley |
| 4,926,444 A * | 5/1990 | Hamilton ................ H04L 27/10 375/276 |
| 6,004,027 A | 12/1999 | Sun |

(Continued)

OTHER PUBLICATIONS

International Preliminary Report on Patentability for PCT Application No. PCT/US2019/022088 issued Sep. 15, 2020, 6 pages.

(Continued)

*Primary Examiner* — Daniel B Potratz
(74) *Attorney, Agent, or Firm* — Schott, P.C.

(57) ABSTRACT

A state machine system on a chip presents hidden state transitions to create IC knowledge not available in a logical netlist and temporal key dependencies to increase the difficulty of executing the SAT attack. The change in the state space of a circuit over time may be used to increase circuit security. Hidden transitions that are frequency dependent, state dependent keys, and temporally dependent transition keys may be used as ways to increase security against SAT based attacks.

15 Claims, 6 Drawing Sheets

(56) References Cited

U.S. PATENT DOCUMENTS

| | | | |
|---|---|---|---|
| 8,402,401 B2* | 3/2013 | Chakraborty | G09C 1/00 |
| | | | 713/193 |
| 2014/0070854 A1* | 3/2014 | Kaviani | G01R 23/02 |
| | | | 327/119 |
| 2017/0077761 A1* | 3/2017 | Younis | H02M 7/06 |
| 2017/0149573 A1* | 5/2017 | Sadhasivan | H04L 9/3278 |
| 2018/0032723 A1* | 2/2018 | Danger | G06F 11/10 |
| 2018/0091318 A1* | 3/2018 | Sadhasivan | H04L 9/3278 |

OTHER PUBLICATIONS

International Search Report for PCT Application No. PCT/US2019/022088 mailed on May 24, 2019, 2 pages.

* cited by examiner

ENHANCED CIRCUITY SECURITY THROUGH HIDDEN STATE TRANSITIONS

BACKGROUND

Commercial foundries are becoming an important manufacturing strategy for fabricating integrated circuits (ICs), partially due to the required multi-billion-dollar investment to construct advanced fabrication facilities. In addition, IC design firms are incorporating third-party intellectual property (IP) to reduce design time and development costs. The rise of commercial foundries and third-party IP have shifted a once vertical IC flow to a horizontal design flow with a variety of untrusted entities including third-party IP vendors, fabrication facilities, test facilities, and end-users. Government and commercial ICs, therefore, are vulnerable to IP theft, counterfeiting, overproduction, and the insertion of harmful circuit modifications (hardware Trojans). The challenge for creating secure circuits then becomes protecting against the wide variety of possible threats, including denial of service, theft of information, and/or corrupting functionality.

An area of research that addresses the security risks of IP theft, IC counterfeiting, IC overproduction, and hardware Trojan insertion is logic encryption/locking, which adds additional circuitry (key gates) to an IC to hide the functionality of the circuit from an adversary. The difficulty to steal IP, counterfeit the IC, produce extra ICs, and even insert hardware Trojans is increased as a malicious foundry, or end user, no longer possesses the entire IC design after reverse engineering. However, the SAT based attack presented may circumvent the security provided by logic encryption and, therefore, requires the development of novel measures to defend against the wide variety of threats facing ICs.

Some solutions to the above problems exist, using finite state machines (FSMs). A finite-state machine (FSM) is a mathematical model of computation. It is a machine that can be in one of a finite number of states at any given time. The FSM can change from one state to another in response to some external inputs; the change from one state to another is called a transition. An FSM is defined by a list of its states, its initial state, and the conditions for each transition.

In an example for securing an IC, partitioning an FSM into an obfuscated and functional mode was used to secure logic in HARPOON. For example, an FSM partition that only enters correct operation after the key sequence of P0, P1, and P2 is applied is shown in FIG. 1. The FSM may include black hole states, which are never functionally exited, or gray hole states, which are very hard to functionally exit, to further deter adversaries from attempting to reverse engineer the IC.

Partitioning the FSM into obfuscated and functional modes may also be done using a code-word generated during state transitions when operating in obfuscated mode. An incorrect code word results in incorrect operation of the FSM when in functional mode.

The partitioning of state machines has led to security concerns regarding FSM extraction attacks and fault-injection attacks. Some solutions add incorrect state transitions during normal operation based on the applied key and attempts to increase the number of times the state machine must be unrolled, limiting the SAT attack. These solutions aim to eliminate partitioning of the FSM into obfuscated and functional modes by utilizing dynamic state deflection based on an applied key vector.

The SAT attack may also be applicable to security measures implemented on a FSM that is unrolled n times. The n unrollings provide the SAT solver with context for n FSM transitions, allowing for the elimination of keys similar to the description below under 7.1. Certain prior solutions remove the partitioning of the state machine in favor of adding incorrect state transitions during normal operation of the circuit based on an applied key. The insertion of incorrect state transitions, or edges, makes it more challenging for the successful implementation of the SAT attack as the number of times the FSM must be unrolled increases.

Prior work increases the difficulty of an adversary to reverse engineer the IC. However, some solutions rely on a model of having a completely functional IC available to an adversary with additional known security features implemented that must be circumvented. Some solutions use timing as a means to secure circuits as well but adds a key that is vulnerable to probing with all of the functional design information available to reverse engineer.

SUMMARY OF THE EMBODIMENTS

The state machine system and chip described herein present hidden state transitions to create IC knowledge not available in a logical netlist and temporal key dependencies to increase the difficulty of executing the SAT attack.

The change in the state space of a circuit over time may be used to increase circuit security. Hidden transitions that are frequency dependent, state dependent keys, and temporally dependent transition keys may be used as ways to increase security against SAT based attacks.

Hidden state transitions based on frequency and coupling capacitance may be implemented as a means to prevent an FSM extraction-based attack from determining FSM transitions. In addition, temporally dependent keys may be added to the IC to increase the difficulty of reverse engineering an encrypted IC using the SAT attack.

Masking circuit information from an adversary that has already reverse engineered the IC may be accomplished by adding temporally dependent keys.

Further, the system herein may mask circuit information by requiring a time domain dependence that is only available to the IC designer and limits the efficacy of a SAT attack to decrypt an IC.

DETAILED DESCRIPTION OF THE EMBODIMENTS

1. Introduction

Figure 1:
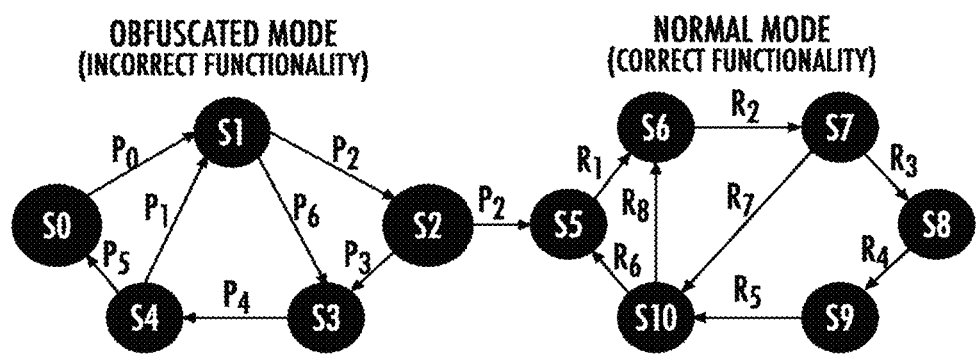
FIG. 1 shows a modified FSM with an enabling sequence of P0, P1, P2 required to enter normal circuit operation.

The state space of an integrated circuit (IC) may be used to increase security. Timing path dependencies and coupling capacitance may be used to create hidden state transitions that are not visible after netlist extraction. Temporal based transitions may also be introduced to shift key dependencies into the time domain. The state space dependencies of the IC may serve as a means to counter the SAT attack. Implementing temporal based transitions may increase the area of the circuit by 68.42%, the power by 43.17% without impacting circuit delay. However, an increased circuit size significantly reduces the overhead of implementing state space encryption. For example, encrypting two registers in the s15850 ISCAS89 benchmark circuit resulted in an area overhead of 0.026%, providing a means to secure sequential logic with minimal overhead.

The FSM herein may be constructed within an integrated circuit and its logic programmed in advance on the circuit hardware using logic gates and other hardware components as necessary. A user may program multiple state definitions and relationships into the FSM, thereby giving it a logical construct, as described herein. Such a circuit including an FSM may be used to secure the circuit against malicious actors.

An integrated circuit may include a finite state machine having functional and obfuscated modes corresponding to the integrated circuit being operable and inoperable. In the inoperable mode, the finite state machine may operate in the obfuscated mode in the absence of proper input. And in response to proper input in the form of a logic signal that may comprise a predetermined frequency/coupling capacitance and/or a logical sequence, the finite state machine may operate in the functional mode using hidden state transitions not accessible in the absence of the proper input.

2. Threat Model I

The threat model is the same as that utilized by the SAT attack, where an adversary has access to an activated IC capable of producing correct input-output (IO) pairs. In addition, a secure scan-chain is assumed, where the scan-chain output is not available to the adversary, as exposing the IC state to an adversary through the activated IC drastically decreases the security available from logic obfuscation.

2.1 Vulnerability to the SAT Attack

The gains in security of implementing logic encryption are attributed to the large number of possible IO combinations that prevent an adversary from performing a brute force attack. Fundamentally, the number of IO pairs and key combinations increases exponentially with each additional bit, which limits the feasibility of a brute force attack. However, an SAT attack with limited correct IO pairs from an activated IC, the logic encryption key may be extracted for 95% of the ISCAS85 benchmarks within 10 hours. Thus, a brute force attack may no longer be required as the addition of a single IO constraint to the SAT solver prunes a significant amount of the key space, weakening the security of logic encryption 2.2 Preventing the SAT Attack The SAT attack is premised on the concept that an incorrect output by a given key results in the removal of the said key and a refinement of the constraints imposed on the solver. The systems and machines described herein may create temporal dependencies in the key, which prevents the discarding of key values once an incorrect output is observed when applying the SAT attack. Instead, the constraints for the SAT attack may require awareness of the current state, which increases the difficultly of eliminating keys. The system and machine also introduces hidden state transitions that create secret FSM transitions that are not logically present in the reverse-engineered netlist of the encrypted IC.

3. Hidden State Transitions I

Figure 2:
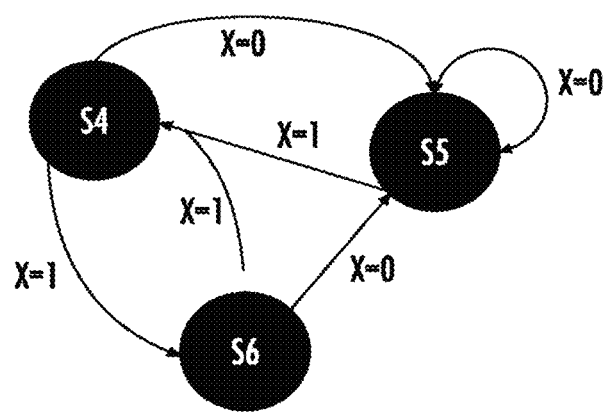
FIG. 2 shows an original state machine with a single input X.

A means to add hidden transitions to a finite state machine based on 1) the frequency of an IC, and 2) coupling capacitance are described in this section. Both techniques modify the FSM to create hidden state transitions that are not present within the logic of the FSM. The original state machine shown in FIG. 2, which shows states labeled with X and a number, and inputs as X, may be modified using both techniques to demonstrate functionality.

3.1 Frequency Based Hidden State Transitions

Figure 3:
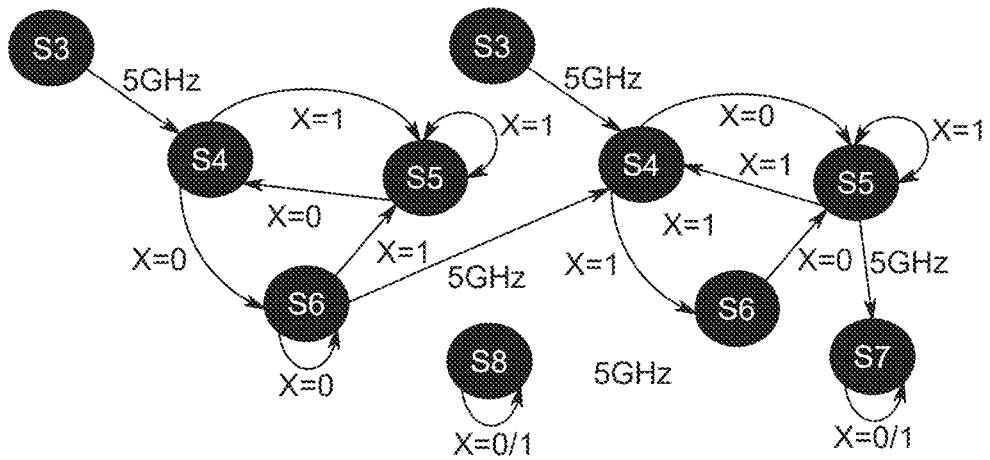
FIG. 3 shows state machine with hidden transitions from S3 to S4, S6 to S8, and S5 to S7 that activate at 5 GHz. A single input X is applied to the circuit.

The technique described herein may use frequency changes to implement hidden state transitions. The FSM shown in FIG. 3 is developed with a frequency-based hidden state transition from S3 to S4. The utilization of the frequency domain removes a direct logical representation of the circuit after reverse engineering. Only the IP developer may be aware of the transition from S3 to S4 at a frequency of 5 GHz created by a strategic timing glitch in the circuit. Therefore, FSM recovery and other techniques that exploit state reachability are not able to discern the state transition. The states S7 and S8 are also partitioned from the original circuit, creating the appearance of four state machines when the FSM recovery tools are applied.

Frequency-based state traps such as state S7, which serves as a black-hole state that is not exited, are also possible to prevent an adversary from blindly increasing the frequency. The design transitions to S7 if the 5 GHz frequency is maintained for three clock cycles. Entering another state machine partition or restarting the sequence to enter functional mode are additional available options when adding hidden states.

Figures 4A, 4B:
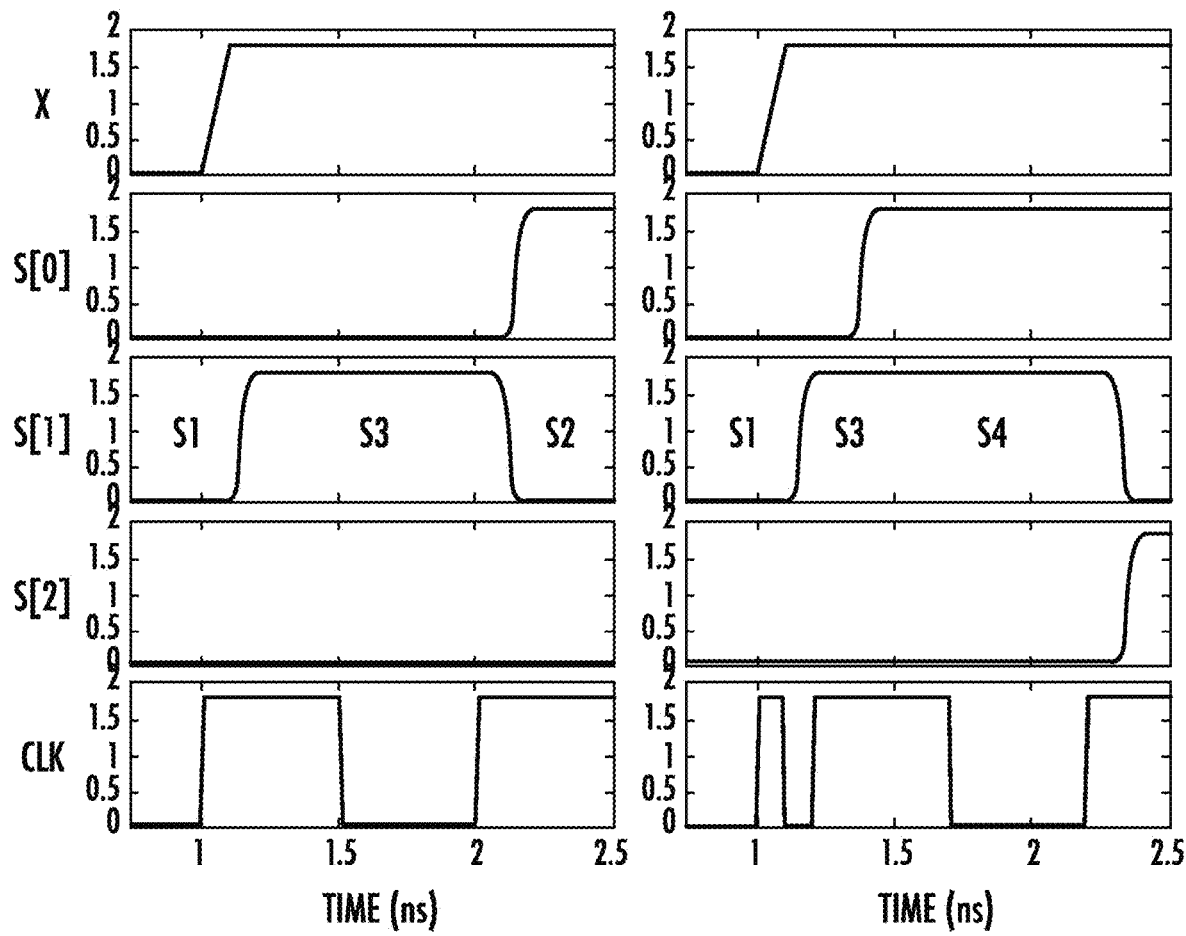
FIGS. 4A and 4B show a simulation of the state machine with 4A) no frequency-based state transition, and 4B) a temporary increase in clock frequency to enable a hidden state transition to S4.

To verify the above design, SPICE simulation was used to verify the operation of the implemented FSM with frequency dependent hidden states. The results are shown in FIG. 4B and indicate that while in S3, when the frequency is increased to 5 GHz, the circuit transitions to S4 (S1 to S3 to S4). However, if the frequency is unaltered, as shown in FIG. 4A, the circuit stays in S3 and transitions to S2 on the next clock cycle.

The implementation of the hidden states into the FSM as shown in FIG. 3 resulted in an overhead of 97% in area, 44.5% in power, and 32.1% in delay. As the required modifications remain relatively independent of circuit size, since an additional flip-flop expands the number of states exponentially, increasing the circuit size decreases the overhead required to add the frequency dependent hidden states. In addition, using "don't care states" for hidden state transitions requires only a small increase in combinational logic.

3.2 Hidden Transitions Using Coupling Capacitance

Figure 5:
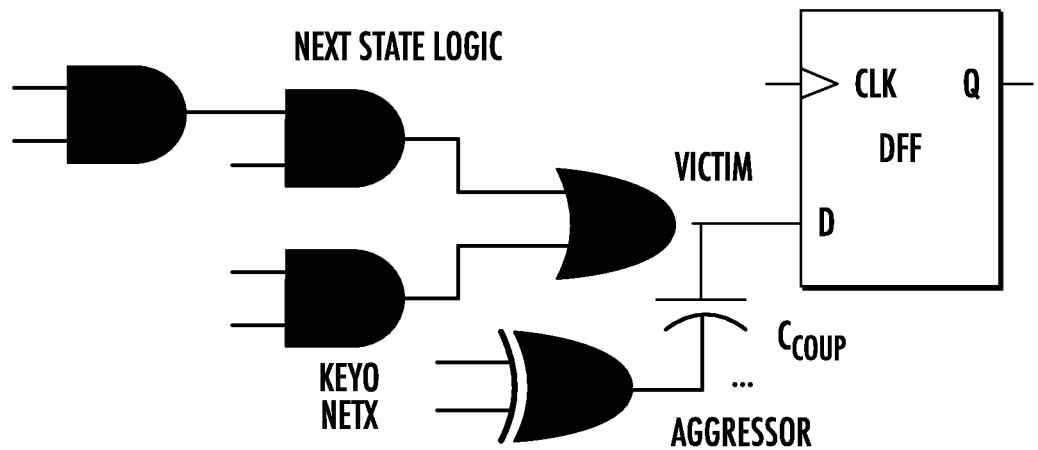
FIG. 5 shows coupling capacitive based transition.

In addition to the frequency-based transitions presented in Section 3.1, coupling capacitance may be used as to create hidden state transitions in an FSM. A circuit implementing a coupling-based partition may be developed to generate a hidden state transition from S3 to S4 for the state machine shown in FIG. 3. The topology shown in FIG. 5 uses a nearby key gate as the aggressor to ensure the controllability of the switching on the victim line. Minimum spacing between the aggressor and victim line may be assumed along a coupling length of 100 μm in a 180 nm technology.

Figure 6:
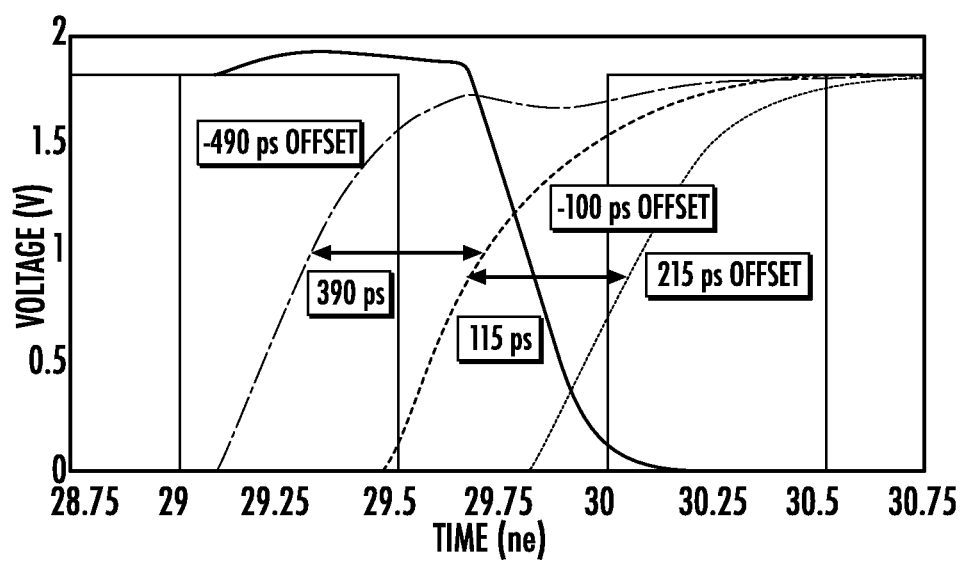
FIG. 6 shows analysis of aggressor switching time vs state transition.

To verify the operation of the FSM, a SPICE analysis of the hidden state transitions applying the coupling capacitance-based technique was completed. The analysis of the aggressor arrival period producing a strategic glitch is shown in FIG. 6, indicating that the aggressor switching between −490 ps and 215 ps of the victim switching is sufficient to change states. Therefore, for a 1 GHz clock signal, 70% of the clock period is available to switch states using the aggressor. An adversary must, therefore, determine the correct state of the FSM to activate the aggressor, the net acting as the hidden transition, and the signals to control to activate the transition.

Note that utilization of fault injection attacks still results in entering the correct functional state machine from the obfuscated partition (S1, S2, S3), shown in FIG. 3, bypassing the added security features. However, a methodology that prevents fault injection attacks from bypassing hidden state transitions is described below.

4. Temporal Based Transitions I

While the hidden state transitions provide a means to mask the logical netlist, relying on frequency or coupling capacitance during functional operation may not be the only manner to achieve the transitions. Instead, it is possible to add logic to the register clock input that provides the ability to create temporally dependent keys. A circuit addition may be to gate the clock and use a key input as a control line. If further control through the addition of pulses to the clock signal is required, the topologies shown in FIGS. 7A and 7B may allow for such flexibility. The first topology, shown in FIG. A, gates the clock and applies an XOR to the clock gating control line. As a result, the state of a given register is held at any given state and time reference when logical sequence input signal with KEY0=0, allowing for hidden transitions to occur. The topology depicted in FIG. 7B allows for more flexibility through the use of an AND/OR gate to implement clock gating, which permits the clock to be held low. When holding the clock low and setting KEY1=1, additional clock pulses are applied to the flip-flops.

Figure 7A:
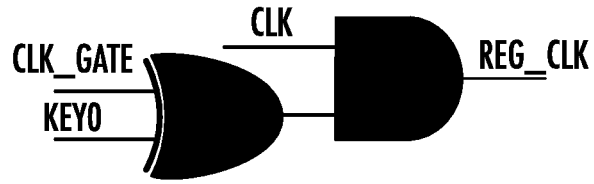
FIGS. 7A and 7B show hidden transition circuit topologies: 7A) Clock signal gated with an AND gate and an XOR control of the clock gating, and 7B) clock gated with an AND/OR, and with an XOR control of the clock gating.
Figure 8:
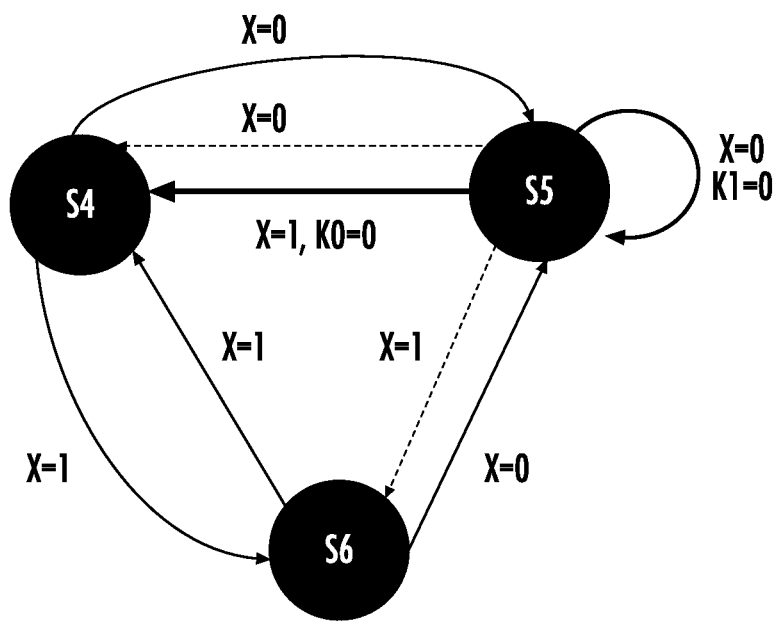
FIG. 8 shows altered an FSM that requires a temporally dependent key. Dotted lines represent incorrect edges that are corrected by asserting K0 or K1 in S5 (correct transitions are shown as thick red lines).

To create the temporally dependent circuit, the original FSM may be modified by replacing the original transitions with incorrect transitions. The circuit may be modified by including the structures shown in FIG. 7A at the clock input of each register of the circuit. For the FSM shown in FIG. 2, the transition S5 to S4 is replaced with S5 to S6 and the transition S5 to S5 is replaced with the transition S5 to S4. The reverse-engineered state machine now appears as shown in FIG. 8. When in S5, the correct functionality is achieved by setting K0=0 when X=1 and K1=0 when X=0, as shown by the thick red transitions in FIG. 8.

The adversary no longer observes the original functionality of the FSM after reverse engineering the circuit, preventing FSM recovery tools from determining the original transitions. In addition, fault injection attacks are no longer useful as the state machine is not partitioned into obfuscated and functional regions. Additionally, the temporally dependent key requires a different key sequence for each unrolled instance of the state machine, which limits the efficacy of the SAT attack as a key sequence is no longer pruned if an incorrect result is seen at the output of the circuit for an unrolled design that does not cover the entire FSM. Essentially, the adversary may now be forced to validate the temporally dependent key for each state within the FSM.

Figure 7B:
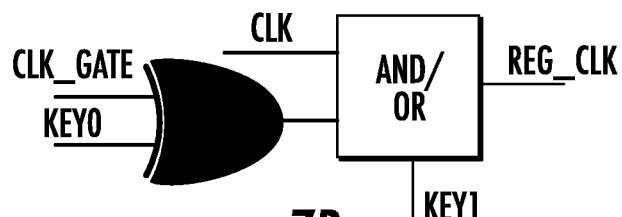

The implementation of the temporally dependent state machine does not incur any performance overhead as the combinational paths do not require any additional elements. The area and power overhead of, respectively, 68.42% and 43.17% for adding the XOR based clock gating shown in FIG. 7a is large for the implemented FSM. As the logical depth and amount of combinational logic increases in the circuit, the overheads drop significantly. For example, the area overhead of encrypting two registers is 5.08% for the ISCAS89 s298 (75 gates) benchmark, whereas the s15850 (3448 gates) benchmark circuit only incurs a 0.026% penalty in area.

5. Threat Model II

A second assumed threat model includes an attacker who has access to an activated IC that produces correct input-output (IO) pairs, similar to the threat model for the SAT attack discussed above. In addition, the attacker has reverse engineered the locked netlist from the integrated circuit layout, which allows the attacker to create a set of miter formulae that represent the circuit for satisfiability (SAT) attack analysis with the correct IO pairs. It is assumed that the output from the scan-chains used for circuit verification is not available to the adversary, as exposing the state transitions and logic to the adversary through the activated IC makes securing the locked netlist virtually impossible. Essentially, an adversary with scan-chain access has the opportunity to break many low complexity circuits generated from the partitioning of the IC for formal verification instead of the large complexity of analyzing the entire active circuit.

5.1 SAT Attack Vulnerability

As with Threat I, logic encryption relies on the complexity of the circuit to create a large unknown logic space that renders a brute force attack infeasible.

5.2 Preventing the SAT Attack

The SAT attack is a probing based attack that requires access to the key signals and the known possible values of the key to significantly reduce the complexity of the circuit logic space. Countering the SAT attack requires circuit information that is not leaked by reverse engineering the encrypted IC. The proposed defense to such an attack shifts state machine functionality into the time domain with a key dependency, generating circuit information that only the IC developer holds. In addition, the pruning of incorrect key sequences may be limited as the correct key may also be pruned if in an incorrect state.

6. Adding FSM Time Dependencies

Adding hidden transitions to a state machine may be based on 1) the frequency of an IC, 2) state dependent keys, and 3) temporally dependent transitions is described in this section.

6.1 Frequency Based Hidden State Transitions

Modifying the FSM to create hidden state transitions that are not present within the logic of the FSM gating the clock and applying an XOR to the clock gating control line were discussed above.

Note that fault injection attacks may still be utilized to enter the functional state machine from the obfuscated partition (S1, S2, S3) shown in FIG. 3. However, methodologies that discourage fault injection attacks are described in below that limit malicious state transitions from bypassing added security features.

6.2 State Dependent Key Values

The use of sequential elements in a circuit allow for the creation of keys that are state dependent. As the SAT attack decides on a single key value, the attack must now divide the circuit into a subset of states to verify the key and also determine the proper temporal change in key values. Essentially, all key combinations in all states must be verified since an incorrect key for one IO pair no longer implies a pruning of a set of keys, as is done with the SAT attack. The incorrect key value may be required in a different state or with a different IO pair to enable correct circuit functionality.

Figure 9A:
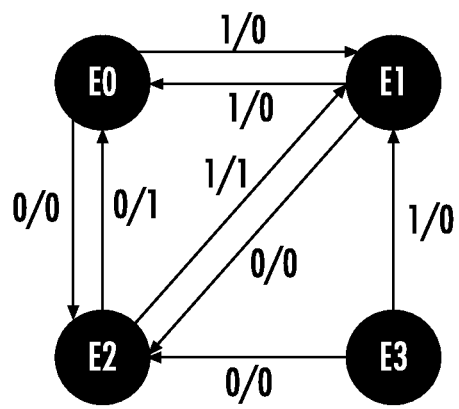
FIG. 9 shows a state dependent key circuit topology for a) K0=0, correct key for functional mode, and b) K0=1, correct key for obfuscated mode. The hidden transition, represented by a dotted line, only exists when K0=1 in the obfuscated mode.
Figure 9A:
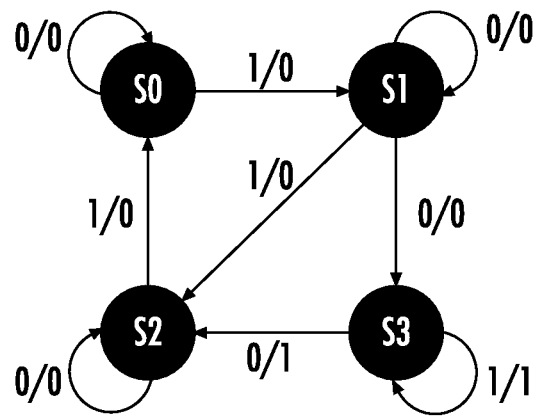
Figure 9B:
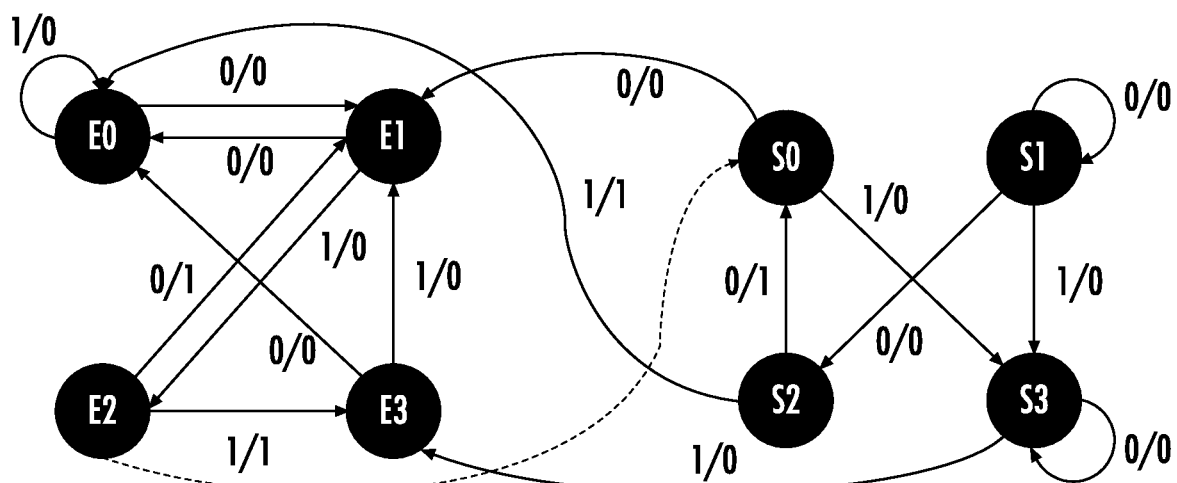

An example of adding state dependent keys to a circuit is shown in FIG. 9, which also includes the hidden states. In addition, all of the original states are re-encoded with a randomly assigned new state bit to ensure that there is no imbalance in the switching probability of the newly added register in comparison to the original state machine registers. Notice that when K0=1, many of the transitions from the original state machine now return to the obfuscated mode, which implies that a simple fault injection is difficult to execute without knowledge of the key.

Implementing the modifications to the state machine incurs a significant overhead in terms of power, performance, and area for the small FSM used as an example. An increase of 457.89% in area, 881.23% in power, and 40.48% in timing was observed. However, a significant portion of the overhead is due to the required increase in switching activity on the additionally inserted flip-flop. If the comparison is completed between the partitioned FSM with and without the state dependent key values, there is an increase of 99.99% in area, 117.91% in power, and 25.53% in timing. As with the hidden state transitions, the overhead is significantly reduced as the size of the circuit is increased.

There is also a trade-off between the number of state dependent key edges and the overhead in power, area, and timing as edge insertion that leads to logical simplification is possible. However, such an insertion strategy benefits an adversary who is aware of the insertion methodology by leaking information on the states that require an altered key. While increased complexity is added to the design, the added combinational logic also leaks information on which transitions are key dependent and possibly even the correct transition itself. A verification procedure for IC designers is, therefore, required to assure no additional information is leaked.

6.3 Temporal Based Transitions

Figure 10:
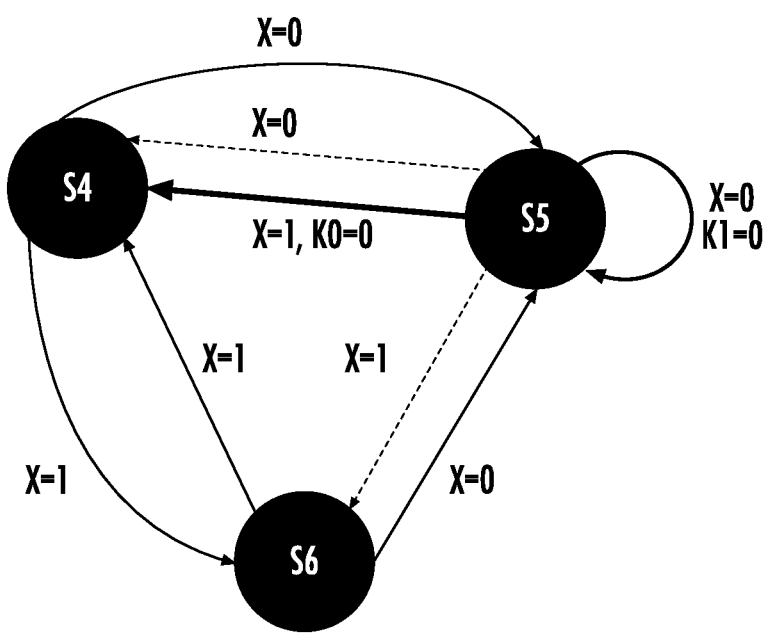
FIG. 10 shows an altered FSM that requires a temporally dependent key. Dotted lines represent incorrect edges that are corrected by asserting K0 or K1 in S5 (correct transitions are shown as thick red lines).

The original FSM may be altered by replacing original transitions with incorrect transitions. For the FSM shown in FIG. 2, the transition S5→S4 may be replaced with S5→S6 and the transition S5→S5 may be replaced with the transition S5→S4. The reverse-engineered state machine now appears as shown in FIG. 10. The only addition to the circuit is the inclusion of the structures shown in FIGS. 7A and 7B at the clock input of one, or multiple registers, within the design. For this specific example, the topology in FIG. 7A is chosen and is applied to both state registers. The correct functionality, when in S5, is achieved by setting K0=0 when X=1 and K1=0 when X=0, as shown by the thick transitions in FIG. 10.

After reverse engineering, the adversary no longer observes the original functionality of the FSM, preventing FSM recovery tools from determining the original transitions. Fault injection attacks are also no longer useful as the state machine is not partitioned into obfuscated and functional regions. Additionally, the temporally dependent key may not allow for the unrolling of the state space and, therefore, limits the efficacy of the SAT attack as a key sequence no longer is pruned if it is invalid during a certain set of state transitions. Rather, the entire state space must be validated to ensure the correct key is obtained.

The implementation of the temporally dependent state machine does not incur any performance overhead as the combinational paths do not require any additional elements. The area and power overhead of, respectively, 68.42% and 43.17% for adding the XOR based clock gating shown in FIG. 7A is large for the implemented FSM. As the logical depth and amount of combinational logic increases in the circuit, the overheads drop significantly. For example, the area overhead of encrypting two registers is 5.08% for the ISCAS89 s298 (75 gates) benchmark and 0.026% for the s15850 benchmark (3448 gates).

While the invention has been described with reference to the embodiments above, a person of ordinary skill in the art would understand that various changes or modifications may be made thereto without departing from the scope of the claims.

We claim:

1. An integrated circuit, comprising:
   a finite state machine having functional and obfuscated modes corresponding to the integrated circuit being operable and inoperable; and
   a circuit to add hidden state transitions to the finite state machine, wherein the hidden state transitions are based on frequency and coupling capacitance of the integrated circuit,
   wherein the finite state machine operates in the obfuscated mode in absence of proper input, and
   wherein in response to the proper input, the finite state machine operates in the functional mode using the hidden state transitions not accessible in the absence of the proper input.

2. The integrated circuit of claim 1, wherein the proper input is a predetermined frequency and a logical sequence.

3. The integrated circuit of claim 1, wherein the proper input is a predetermined coupling capacitance and a logical sequence.

4. The integrated circuit of claim 1, wherein the finite state machine comprises multiple states, and transitions between at least two of the multiple states requires the proper input.

5. The integrated circuit of claim 4, wherein in the obfuscated mode, the finite state machine engages state traps that prevent the transitions between the at least two of the multiple states.

6. The integrated circuit of claim 4, wherein the proper input includes a predetermined frequency maintained for a predetermined number of cycles.

7. The integrated circuit of claim 4, wherein the proper input includes a predetermined coupling capacitance.

8. The integrated circuit of claim 4, wherein the multiple states are re-encoded with a randomly assigned new state bit.

9. The integrated circuit of claim 8, wherein the re-encoding is done to ensure that there is no imbalance in a switching probability of a newly added register in comparison to original state machine registers.

10. The integrated circuit of claim 1, wherein the mode is determined in response to a logical signal.

11. A method for securing an integrated circuit, comprising:

providing a finite state machine having functional and obfuscated modes corresponding to the integrated circuit being operable and inoperable; and adding hidden state transitions to the finite state machine, wherein the hidden state transitions are based on frequency and coupling capacitance of the integrated circuit, wherein the finite state machine operates in the obfuscated mode in absence of proper input, and wherein in response to the proper input, the finite state machine operates in the functional mode using the hidden state transitions not accessible in the absence of the proper input.

12. The method of claim 11, wherein the proper input is a predetermined frequency and a logical sequence.

13. The method of claim 11, wherein the proper input includes a predetermined coupling capacitance.

14. The method of claim 11, wherein the finite state machine comprises multiple states, and transitions between at least two of the multiple states requires the proper input.

15. The method of claim 14, wherein in the obfuscated mode, the finite state machine engages state traps that prevent the transitions between the at least two of the multiple states.

* * * * *